United States Patent
Sato (10) Patent No.: US 9,332,095 B2
(45) Date of Patent: May 3, 2016

(54) PORTABLE ELECTRONIC APPARATUS

(71) Applicant: KYOCERA Corporation, Kyoto-shi, Kyoto (JP)

(72) Inventor: Takafumi Sato, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/436,452

(22) PCT Filed: Oct. 4, 2013

(86) PCT No.: PCT/JP2013/077131
§ 371 (c)(1),
(2) Date: Apr. 16, 2015

(87) PCT Pub. No.: WO2014/061476
PCT Pub. Date: Apr. 24, 2014

(65) Prior Publication Data
US 2015/0264163 A1 Sep. 17, 2015

(30) Foreign Application Priority Data
Oct. 16, 2012 (JP) .................... 2012-229019

(51) Int. Cl.
| H04M 1/00 | (2006.01) |
| H04B 1/38 | (2015.01) |
| H04M 1/02 | (2006.01) |
| G06F 1/16 | (2006.01) |

(52) U.S. Cl.
CPC .......... *H04M 1/0266* (2013.01); *G06F 1/1637* (2013.01); *G06F 1/1656* (2013.01); *H04M 1/0249* (2013.01); *H04M 2250/22* (2013.01)

(58) Field of Classification Search
CPC .......................... Y10T 156/10; H04M 1/0202
USPC ........................................................ 455/566
See application file for complete search history.

(56) References Cited

U.S. PATENT DOCUMENTS

| 6,400,571 B1 * | 6/2002 | Kimura ................. G06F 1/18 165/185 |
| 2014/0217451 A1 | 8/2014 | Wu |

FOREIGN PATENT DOCUMENTS

| JP | 04-039993 A | 2/1992 |
| JP | 2000-196249 A | 7/2000 |

(Continued)

OTHER PUBLICATIONS

International Search Report dated Dec. 3, 2013 issued in counterpart International application No. PCT/JP2013/077131.

*Primary Examiner* — Eugene Yun
(74) *Attorney, Agent, or Firm* — Procopio Cory Hargreaves and Savitch LLP (57) ABSTRACT

A portable electronic device is provided, in which a region for joining a body to a member-to-be-fixed is designed to be narrow, and the body and the member-to-be-fixed are strongly joined together. The portable electronic device is provided with a body 2A and a member-to-be-fixed 3a, which is bonded and fixed to the body 2A by way of an adhesive 231. The body 2A has: a first face 22, on which the member-to-be-fixed 3a is mounted; and a second face 23, which is bonded to the member-to-be-fixed 3a, in a state where the second face 23 is at a distance from the member-to-be-fixed 3a by interposing the adhesive 231, and the second face 23 is in an intersecting positional relationship with the first face 22.

16 Claims, 6 Drawing Sheets

(56) References Cited

FOREIGN PATENT DOCUMENTS

| JP | 2010-081517 A | 4/2010 |
| JP | 2011-035856 A | 2/2011 |
| JP | 2012-095152 A | 5/2012 |
| JP | 2012-114663 A | 6/2012 |

* cited by examiner

PORTABLE ELECTRONIC APPARATUS

TECHNICAL FIELD

The present invention relates to a portable electronic device such as a portable terminal device.

BACKGROUND ART

Conventionally, in a portable electronic device such as a portable terminal device and a mobile telephone device, a cover glass, which composes a touch screen display as a member-to-be-fixed, is adhered to a stepped portion of a body, by way of a double-sided adhesive tape (for example, refer to Patent Document 1).

Patent Document 1: Japanese Unexamined Patent Application, Publication No. 2012-114663

DISCLOSURE OF THE INVENTION

Problems to be Solved by the Invention

As compared to a liquid or gelatinous adhesive, a double-sided adhesive tape is easy to handle, but has limited adhesive strength and water resistance. Therefore, the width of the double-sided adhesive tape, i.e. the width of the adhesive face, must be wide. In cases of smartphones, etc., a screen size is desired to be further increased by upsizing a touch screen display as a member-to-be-fixed, while a body itself is not desired to be upsized; therefore, the width of the adhesive face for bonding a member-to-be-fixed must be narrow.

An object of the present invention is to provide a portable electronic device, in which a region for joining a body to a member-to-be-fixed is designed to be narrow, and the body and the member-to-be-fixed are strongly joined together.

Means for Solving the Problems

A portable electronic device according to the present invention is provided with: a body and a member-to-be-fixed, which is bonded and fixed to the body by way of an adhesive; in which the body has: a first face, on which the member-to-be-fixed is mounted; and a second face, which is in an intersecting positional relationship with the first face, and which is bonded to the member-to-be-fixed at a distance from the member-to-be-fixed by interposing the adhesive.

The present invention may be provided with a third face, which extends from the first face in a direction away from the member-to-be-fixed; in which the second face may be located at an extending end of the third face.

The member-to-be-fixed may have a chamfer at a position corresponding to an edge of a facing face of the member-to-be-fixed facing the first face; and the first face may protrude in a direction transverse to a direction away from the adhesive, and may have a first convex portion arranged at a position facing the chamfer.

The second face may be subjected to surface-roughening treatment.

The surface-roughening treatment may be performed with a laser, or by surface-roughening a part of a mold forming the body, which is a part of a surface composing a cavity.

The second face may have a second convex portion extending in a direction transverse to a direction away from the adhesive.

An angle, at which the second face intersects with the first face, may be 5 to 30 degrees inclusive.

The member-to-be-fixed may have a facing face, which faces the first face; a part of the facing face may have a non-facing portion, which does not face the first face and the second face; a second member-to-be-fixed may be bonded and fixed to the non-facing portion; and an edge of the second face, which is the farthest from the facing face, may be at a greater separation distance from the facing face than an edge of the second member-to-be-fixed, which is the farthest from the facing face.

The body may be substantially rectangular; in which the member-to-be-fixed may be substantially rectangular, which is smaller than the body; a pair of short sides of the member-to-be-fixed may be arranged adjacently to a pair of short sides of the body, respectively; and a pair of long sides of the member-to-be-fixed may be arranged adjacently to a pair of long sides of the body, respectively; the member-to-be-fixed may be bonded to the body, along a portion in a vicinity of the pair of long sides of the member-to-be-fixed, and along a portion in a vicinity of one of the short sides; and a portion in a vicinity of an other of the short sides of the member-to-be-fixed may be fixed to the body, along the other of the short sides of the member-to-be-fixed, by way of a double-sided adhesive tape.

Effects of the Invention

According to the present invention, a portable electronic device can be provided, in which a region for joining a body to a member-to-be-fixed is designed to be narrow, and the body and the member-to-be-fixed are strongly joined together.

PREFERRED MODE FOR CARRYING OUT THE INVENTION

Descriptions are provided below with reference to the drawings, with respect to embodiments of cases where a portable electronic device according to the present invention is applied to a portable terminal device.

First Embodiment

Figure 1:
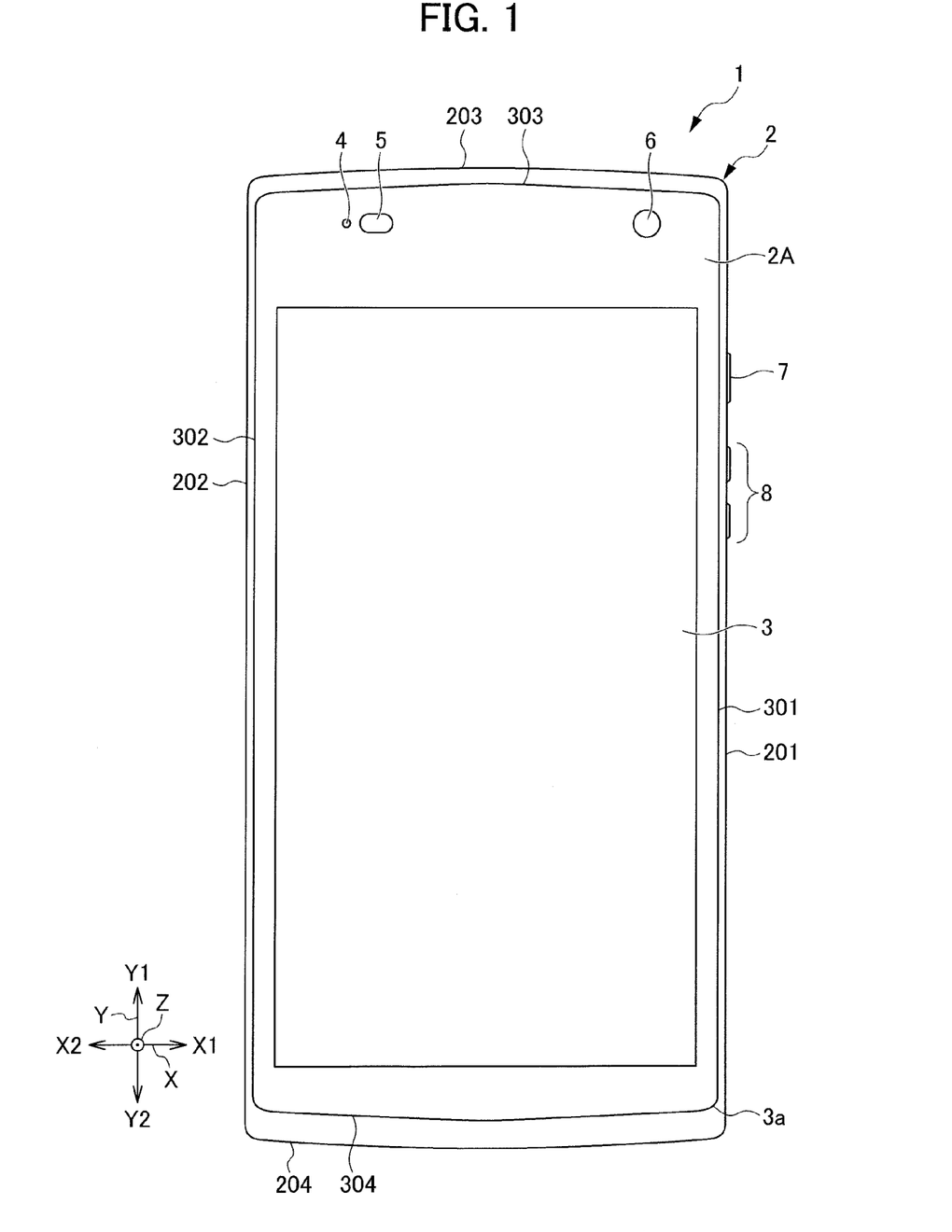
FIG. 1 is a front view showing an external appearance of a portable terminal device 1 in a first embodiment.
Figure 2:
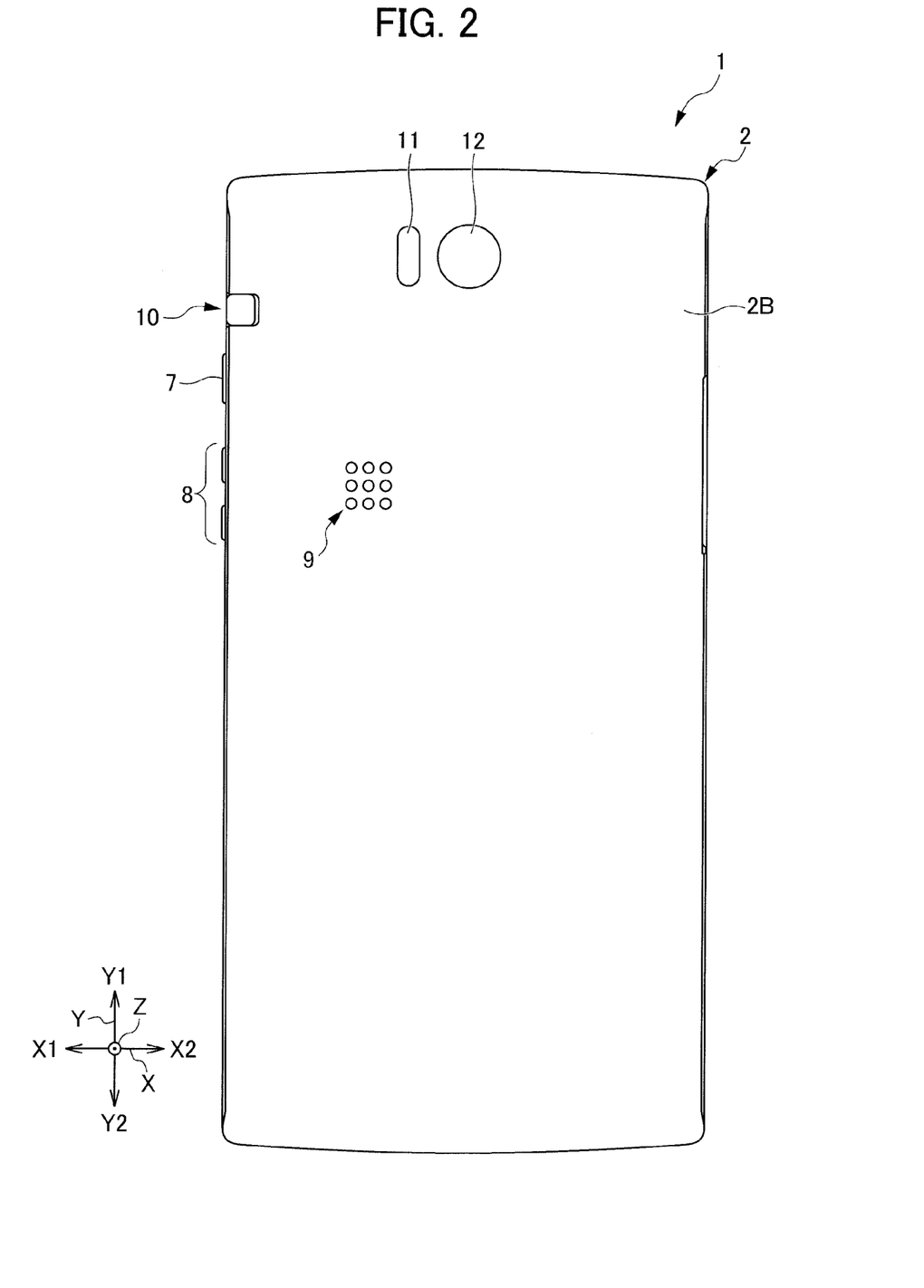
FIG. 2 is a rear view showing an external appearance of the portable terminal device 1 in the first embodiment.
Figure 3:
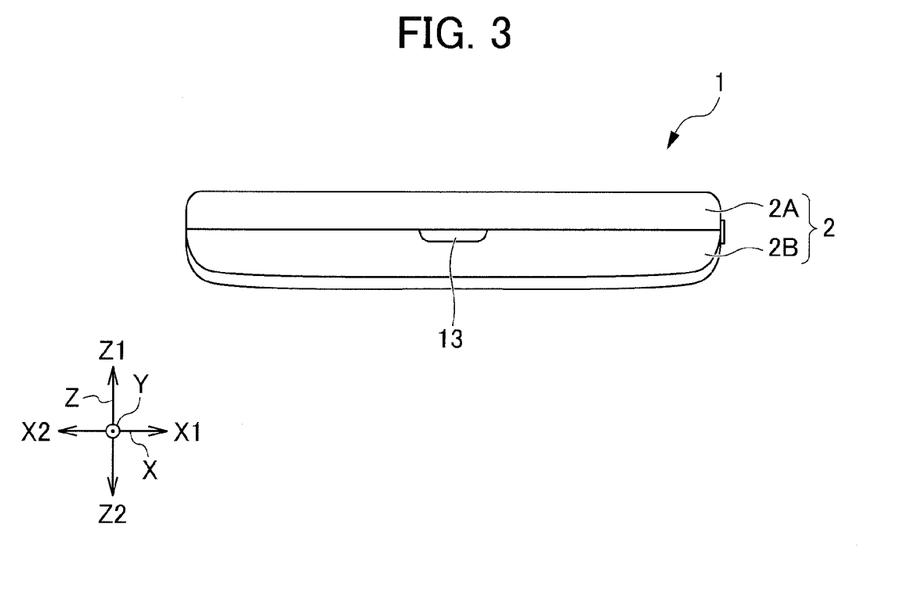
FIG. 3 is a bottom view showing an external appearance of the portable terminal device 1 in the first embodiment.
Figure 4:
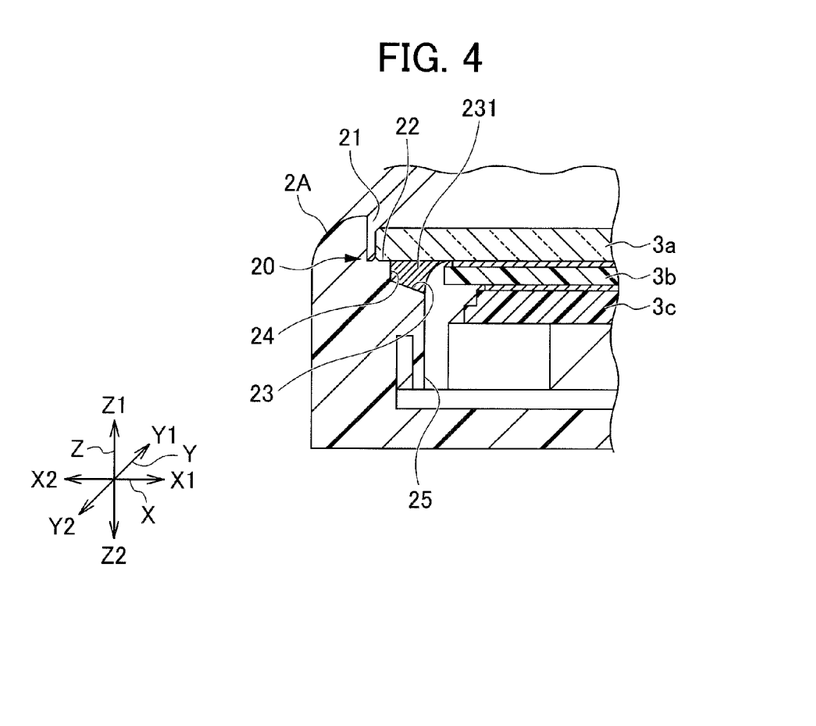
FIG. 4 is an enlarged cross-sectional view showing the portable terminal device 1 in the first embodiment.

First of all, an overall configuration of a portable terminal device 1 in a first embodiment is described. FIG. 1 is a front view showing an external appearance of the portable terminal device 1 in the first embodiment. FIG. 2 is a rear view showing an external appearance of the portable terminal device 1 in the first embodiment. FIG. 3 is bottom view showing an external appearance of the portable terminal device 1 in the first embodiment. FIG. 4 is an enlarged cross-sectional view showing the portable terminal device 1 in the first embodiment.

The drawings each show coordinate systems of the portable terminal device 1, i.e. a first direction (X-direction), a second direction (Y-direction), and a third direction (Z-direction). In the first direction (X-direction), a direction corresponding to the rightward direction in FIG. 1 is defined as a first plus direction (X1-direction); and a direction corresponding to the leftward direction in FIG. 1 is defined as a first minus direction (X2-direction). In the second direction (Y-direction), a direction corresponding to the upward direction in FIG. 1 is defined as a second plus direction (Y1-direction); and a direction corresponding to the downward direction in FIG. 1 is defined as a second minus direction (Y2-direction). In the third direction (Z-direction), a direction corresponding to the upward direction in FIG. 3 is defined as a third plus direction (Z1-direction); and a direction corresponding to the downward direction in FIG. 3 is defined as a third minus direction (Z2-direction).

As shown in FIGS. 1 to 3, the portable terminal device 1 has a body 2, which is a main body unit. The body 2 has a first body 2A and a second body 2B. The first body 2A is a member, which is arranged to the side that faces a user. A touch screen display 3 (to be described later) is arranged in the first body 2A. The second body 2B is a member, which is arranged to the side that faces a palm, etc.

As shown in FIG. 1, the touch screen display 3, an incoming lamp 4, a proximity sensor 5, and an in-camera 6 are arranged in the first body 2A.

The touch screen display 3 is arranged to a front side of the first body 2A. As shown in FIG. 4, the touch screen display 3 has a cover glass 3a, a touch screen 3b, and a display 3c.

The cover glass 3a is a transparent glass plate, which is arranged to the outermost side of the touch screen display 3.

The touch screen 3b detects a touch with a finger, a stylus pen or the like through transmission from the touch screen display 3. The touch screen 3b can detect a position(s) and/or a gesture of a plurality of fingers, a stylus pen or the like, which touch the touch screen display 3. The method for detecting a touch to the touch screen 3b with a finger, a stylus pen or the like may be an arbitrary method, such as a capacitive sensing method, a resistive film method, a surface acoustic wave method (or an ultrasonic sensing method), an infrared ray method, an electromagnetic induction method, or a load detecting method.

The display 3c is composed of a display device such as a liquid crystal display, an organic electroluminescent panel, or an inorganic electroluminescent panel. The display 3c can display an image such as characters and graphics. Note that the display 3c in the present embodiment has a function of a receiver to vibrate itself to conduct sound.

The incoming lamp 4 blinks in accordance with preset patterns, when receiving an incoming phone call or email. The incoming lamp 4 lights in a predetermined color, while recharging.

The proximity sensor 5 contactlessly detects an approach of an object to the first body 2A side. The proximity sensor 5 and a sensor detection surface (not shown) of the proximity sensor 5 are arranged to the front side, in orientation to face the first body 2A. For example, during a phone call, the proximity sensor 5 detects a user's face approaching the touch screen display 3. A photo sensor (not shown) is provided at the position of the proximity sensor 5. The photo sensor detects ambient brightness, thereby making it possible to adjust the display brightness as appropriate.

The in-camera 6 is a camera for photographing an object facing the first body 2A. Only a lens portion of the in-camera 6 is exposed from the first body 2A.

A power key 7 and a sound volume key 8 are arranged in a second direction of the body 2, on one lateral face which serves as a joining surface of the first body 2A and the second body 2B.

The power key 7 is operated in turning on/off the power, and in transition to or cancellation of a sleep mode, etc.

The sound volume key 8 is operated in adjusting sound volume on a phone call. The sound volume key 8 is composed of two keys. When one key is operated, the sound volume is turned up; and when the other key is operated, the sound volume is turned down.

External connection terminals and an external connection terminal cover (not shown) are arranged in the first direction of the body 2, on the other lateral face which serves as a joining surface of the first body 2A and the second body 2B. When not in use, the external connection terminals are covered by the external connection terminal cover.

As shown in FIG. 2, a speaker 9, an antenna 10, an infrared port 11, and an out-camera 12 are arranged in the second body 2B.

The speaker 9 externally outputs telephone ringtones, and various alarm tones.

The antenna 10 receives terrestrial television signals, etc. A main body (rod portion) of the antenna 10 is incorporated into the body 2, and is drawn out of the body 2 to be used, when watching television. FIG. 2 illustrates only a drawing portion of the antenna 10.

The infrared port 11 is a terminal for transmitting and receiving data through infrared communication.

The out-camera 12 is a camera for photographing an object facing the second body 2B. Only a lens portion of the out-camera 12 is exposed from the second body 2B.

As shown in FIG. 3, the second body 2B has a disassembly concave portion 13 to the bottom side of the body 2. The disassembly concave portion 13 is a slit-shaped opening, which is used to separate the body 2 into the first body 2A and the second body 2B. The user inserts a fingernail or a tool into the disassembly concave portion 13, and applies a force in a direction to separate the second body 2B from the first body 2A, thereby making it possible to separate the first body 2A and the second body 2B.

Next, descriptions are provided for a configuration for joining the touch screen display 3 to the first body 2A in the portable terminal device 1. As shown in FIG. 1, the first body 2A is substantially rectangular. The cover glass 3a as a member-to-be-fixed composing the touch screen display 3 is substantially rectangular, which is smaller than the first body 2A. A pair of short sides 303 and 304 of the cover glass 3a is arranged and fixed adjacently to a pair of short sides 203 and 204 of the first body 2A, respectively. A pair of long sides 301 and 302 of the cover glass 3a is arranged and fixed adjacently to a pair of long sides 201 and 202 of the first body 2A, respectively.

The first body 2A is composed of any one of materials such as polyamide, polycarbonate, ABS, or an alloyed material of polycarbonate and ABS, or is composed of any one of these materials, which is reinforced by glass fiber or the like.

As shown in FIG. 4, a peripheral portion of the first body 2A as a body has a stepped portion 20. The stepped portion 20 is provided so as to make a circuit of the first body 2A. The stepped portion 20 has a lateral face 21, a first face 22, a second face 23, a third face 24, and an inner face 25. The first face 22 is orthogonal to the lateral face 21; and the third face 24 is orthogonal to the first face 22. The second face 23 extends at a slant from an end of the third face 24; and the inner face 25 leads to an extending end of the second face 23. In this manner, the stepped portion 20 has a step-wise aspect.

More specifically, the lateral face 21 and the third face 24 extend in the third direction (Z-direction). In FIG. 4, the lateral face 21 and the third face 24 are parallel with the second direction (Y-direction) and the third direction (Z-direction); however, some of the lateral face 21 and the third face 24 are also parallel with directions other than the third direction (Z-direction), and are parallel with the third direction (Z-direction). In the following description, the lateral face 21 shown in FIG. 4 is described as a typical example.

The first face 22 is parallel with the first direction (X-direction) and the second direction (Y-direction). In FIG. 4, the second face 23 is an inclined face, which dips in the third minus direction (Z2-direction) and in the first plus direction (X1-direction); however, some of the second face 23 are also inclined in directions other than this direction. Namely, the second face 23 is an inclined face, which dips in the third minus direction (Z2-direction) toward the center of the first body 2A shown in FIG. 1. In the following description, the second face 23 shown in FIG. 4 is described as a typical example.

Since the second face 23 is inclined in this manner, the second face 23 is not parallel with the first face 22, but is in an intersecting positional relationship with the first face 22. The angle, at which the second face 23 intersects with the first face 22, is 5 to 30 degrees inclusive, and is more preferably 10 to 20 degrees inclusive. When the angle, at which the second face 23 intersects with the first face 22, is 5 degrees or more, a wide adhesion area can be secured by an adhesive 231 (to be described later); and when the angle is 10 degrees or more, a further wide adhesion area can be secured. When the angle, at which the second face 23 intersects with the first face 22, is 30 degrees or less, the adhesive 231 (to be described later) can be suppressed from flowing away along the tilt of the second face 23; and when the angle is 20 degrees or less, the adhesive can be further effectively suppressed from flowing away.

An end of the lateral face 21 in the third minus direction (Z2-direction) is located at an end of the first face 22 in the first minus direction (X2-direction). The first face 22 extends from the end of the lateral face 21 in the first plus direction (X1-direction). An end of the first face 22 in the first plus direction (X1-direction) is located at an end of the third face 24 in the third plus direction (Z1-direction). The third face 24 extends in a direction away from the cover glass 3a as the member-to-be-fixed, i.e. extends from the end of the first face 22 in the third minus direction (Z2-direction). An extending end as an end of the third face 24 in the third minus direction (Z2-direction) is located at an end of the second face 23 in the third plus direction (Z1-direction).

The second face 23 extends so as to dip in the third minus direction (Z2-direction) from the end of the third face 24 toward the center of the first body 2A. An extending end of the second face 23 is located at an end of the inner face 25 in the third plus direction (Z1-direction). The inner face 25 extends from the end of the second face 23 in the third minus direction (Z2-direction).

The second face 23 is subjected to surface-roughening treatment. The surface-roughening treatment is performed by irradiating the second face 23 with a laser, or by surface-roughening a part of a mold (not shown) forming the body, which is a part of a surface composing a cavity. In the latter case, more specifically, the part to be roughened is a part of the surface composing the cavity forming the second face 23 of the first body 2A.

The adhesive 231 is applied to the second face 23. Therefore, the second face 23 composes an adhesive face. As shown in FIG. 4, the second face 23 of the first body 2A is bonded to the cover glass 3a as the member-to-be-fixed, in a state where the second face 23 is at a distance from the member-to-be-fixed by interposing the adhesive 231. The adhesive 231 is provided so as to make a circuit of the first body 2A, along the vicinity of the pair of long sides 201 and 202 of the substantially rectangular first body 2A, and along the vicinity of the pair of short sides 203 and 204. Although not illustrated, when the cover glass 3a is pressed against the first body 2A to be bonded, a part of the adhesive 231 slightly protrudes onto the first face 22.

The adhesive 231 is composed of a thermosetting and waterproof adhesive 231. More specifically, when the first body 1A and the second body 2A are composed of a fiber-glass-reinforced polyamide resin, a polyamide-based adhesive should be used for the adhesive 231 so as to provide favorable affinity. Alternatively, a silicone resin may be used for the adhesive 231. In short, a material is appropriately selected by considering affinity between a material of the body and an ink printed on the cover glass 3a. Therefore, the adhesive 231 prevents water from penetrating into the portable terminal device 1 through a gap between the second face 23 of the first body 2A and the cover glass 3a.

The first face 22 is provided with a first convex portion 221. The first convex portion 221 protrudes from the first face 22 by about 0.1 mm in the third plus direction (Z1-direction), which is a direction transverse to a direction away from the adhesive 231. The first convex portion 221 extends so as to make a circuit of the first body 2A, along the vicinity of the pair of long sides 201 and 202 of the substantially rectangular first body 2A, and along the vicinity of the pair of short sides 203 and 204. A direction, in which the first convex portion 221 extends, is not parallel with the direction away from the adhesive 231, but is the second direction (Y-direction), which is a direction transverse to the direction away from the adhesive 231.

In the touch screen display 3, as shown in FIG. 4, the cover glass 3a, the touch screen 3b and display 3c, each of which is a plate-like member, are bonded, fixed, and integrated to each other in this order, by interposing the transparent adhesive 312 therebetween.

The cover glass 3a is composed of any one of materials such as tempered glass, acryl, or a composite material of acryl and polycarbonate, or is composed of any one of these materials with ink printed on a surface thereof.

Figure 5:
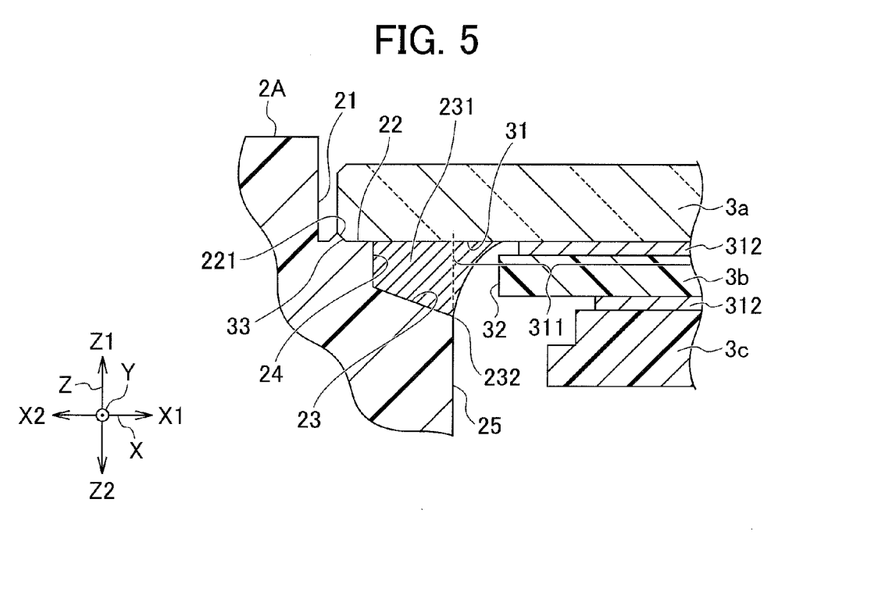
FIG. 5 is an enlarged cross-sectional view showing a portion of FIG. 4, where a cover glass 3a is bonded to a first body 2A.

The cover glass 3a as the member-to-be-fixed is shaped like a substantially rectangular plate, and has a facing face 31. The facing face 31 is composed of one face of the cover glass 3a (a face to the side in the third minus direction (Z2-direction)), and is mounted so as to face the first face 22 of the first body 2A. More specifically, the entire surface of the facing face 31 is not mounted so as to face the first face 22; but only a peripheral portion of the facing face 31 is mounted so as to face the first face 22, along the perimeter. As shown in FIG. 4 or 5, a part of the facing face 31, which is closer to the center of the cover glass 3a than the part facing the first face 22, faces the second face 23 at a distance by interposing the adhesive 231.

A part of the facing face 31 has a non-facing portion 311, which does not face the first face 22 and the second face 23. The non-facing portion 311 is composed of a part of the facing face 31, which is closer to the center of the cover glass 3a than the part facing the second face 23. The touch screen 3b as a second member-to-be-fixed, which is a plate-like member, is bonded and fixed to the non-facing portion 311.

An edge of the second face 23, which is the farthest from the facing face 31 in the third minus direction (Z2-direction), is referred to as an "edge 232". An edge of the second member-to-be-fixed, which is the farthest from the facing face 31 in the third minus direction (Z2-direction), is referred to as an "edge 32". In the third direction (Z-direction), a separation distance from the facing face 31 to the edge 232 is longer than a separation distance from the facing face 31 to the edge 32.

Figure 6:
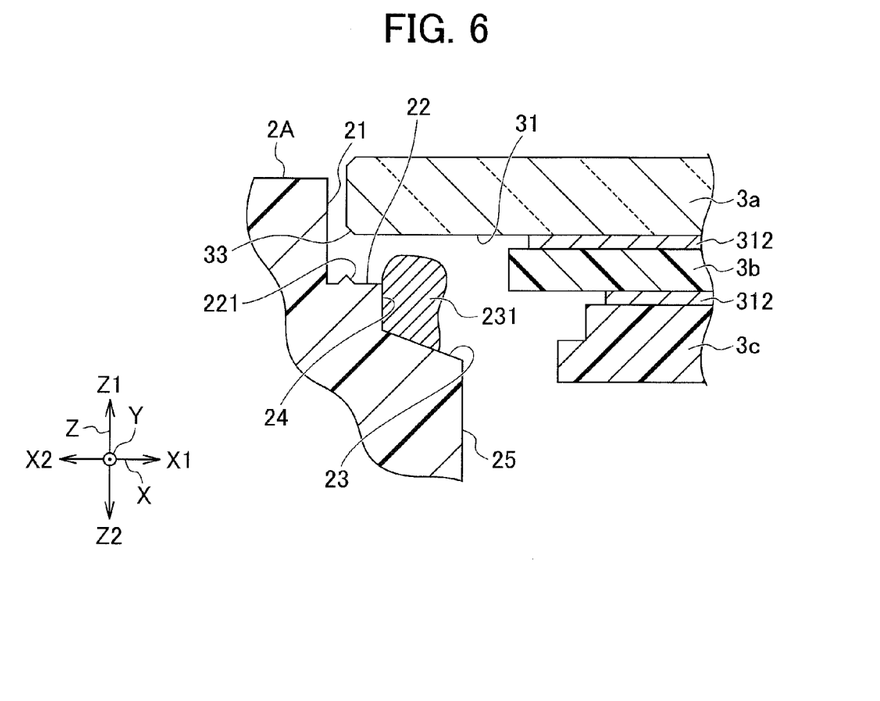
FIG. 6 is an enlarged cross-sectional view showing a state before bonding the cover glass 3a of the portable terminal device 1 to the first body 2A, in the first embodiment.

As shown in FIGS. 4 to 6, the cover glass 3a as the member-to-be-fixed has a chamfer 33. The chamfer 33 is provided along the perimeter of the cover glass 3a. The chamfer 33 is provided at a portion of the cover glass 3a, the portion being at a position corresponding to the edge of the facing face 31. As shown in FIG. 5, the first convex portion 221 is arranged so as to face the chamfer 33. The first convex portion 221 is provided in a space created by the chamfer 33.

In the portable terminal device 1 of the first embodiment described above, the cover glass 3a is bonded to the first body 2A, as follows.

First of all, as shown in FIG. 6, the adhesive 231 is applied to the second face 23 of the first body 2A. Next, the touch screen display 3 is pressed against the first body 2A, until the facing face 31 of the cover glass 3a of the touch screen display 3 abuts on the first face 22. This pressing direction is the third minus direction (Z2-direction). Then, the adhesive 231 is flattened out by the cover glass 3a, and spreads out along the facing face 31, as shown in FIG. 5. By further pressing the touch screen display 3 against the first body 2A, the cover glass 3a as the member-to-be-fixed is mounted on the first face 22. In this state, the cover glass 3a of the touch screen display 3 is bonded and fixed to the first body 2A by way of the adhesive 231.

The aforementioned portable terminal device 1 of the first embodiment can achieve effects as described below.

The first body 2A as the body has: the first face 22, on which the cover glass 3a as the member-to-be-fixed is mounted; and the second face 23, which is bonded to the cover glass 3a, in a state where the second face 23 is at a distance from the cover glass 3a by interposing the adhesive 231, and the second face 23 is in an intersecting positional relationship with the first face 22.

In this manner, the cover glass 3a as the member-to-be-fixed is bonded to the second face 23 of the first body 2A as the body by way of the adhesive 231 instead of a double-sided adhesive tape; therefore, the manufacturing cost of the portable terminal device 1 can be reduced. The adhesive bonding can be achieved by an adhesive property, which is more than several times stronger (for example, more than four times stronger) than a double-sided adhesive tape having the same width as the width of the adhesion region. Even if the width of the adhesive 231 in a direction from the center of the cover glass 3a to the periphery is narrowed, the waterproofing property can be reliably secured. Furthermore, the second face 23 is inclined in an intersecting positional relationship with the first face 22; therefore, a wide area of the second face 23 can be secured, thereby making it possible to secure a wide adhesion area. Furthermore, the second face 23 is subjected to surface-roughening treatment; therefore, the cover glass 3a can be bonded to the second face 23 by a further strong adhesive property. Since the second face 23 is subjected to surface-roughening treatment, the adhesive 231 applied to the second face 23 can be suppressed from flowing away on the second face 23.

The cover glass 3a as the member-to-be-fixed is positioned and mounted on the first face 22; therefore, the adhesive 231 can be suppressed from being needlessly flattened out by the cover glass 3a. This can make it easy to position the cover glass 3a, and to control the thickness of the adhesive 231.

The third face 24 extends from the first face 22 in a direction away from the cover glass 3a as the member-to-be-fixed; and the second face 23 is located at the extending end of the third face 24; therefore, the second face 23 can be located at a sufficient distance from the cover glass 3a. Therefore, when the edge 232 of the second face 23, which is the farthest from the facing face 31, is compared in terms of a positional relationship with the edge 32 of the touch screen 3b as the second member-to-be-fixed, which is the farthest from the facing face 31, a configuration can be established such that the edge 232 is at a greater separation distance from the facing face 31 than the edge 32. Namely, a configuration can be established such that the edge 232 is located farther in the third minus direction (Z2-direction) than the edge 32. As a result, during the manufacturing process of the portable terminal device 1, even if deviation occurs in bonding the touch screen 3b to the cover glass 3a, the edge 32 can be prevented from abutting on the edge 232 when the touch screen display 3 is bonded to the first body 2A. As a result, a configuration can be established, in which the edge 32 is in maximum proximity to the edge 232 in the first direction (X-direction) as shown in FIG. 4.

Since the first convex portion 221 is provided, the adhesive 231, which has spread out on the first face 22, can be suppressed from spreading out farther in a direction toward the lateral face 21 beyond the first convex portion 221.

Since the aforementioned effects can be achieved, a wider area can be secured for the touch screen display 3, and the width of the first body 2A for fixing the touch screen display 3 can be narrowed.

Second Embodiment

Next, a second embodiment of the present invention is described. Note that an overall configuration of a portable terminal device of the second embodiment is the same as the overall configuration of the portable terminal device 1 of the first embodiment; and therefore, points of difference are mainly described herein. In the second embodiment, the same reference numerals are assigned to the same constituent elements as in the first embodiment, and descriptions thereof are omitted as appropriate (some reference numerals and descriptions thereof are omitted together). Members, which are characteristic of the second embodiment, are described by adding "A" to the reference numerals (except for the first body 2A).

Figure 7:
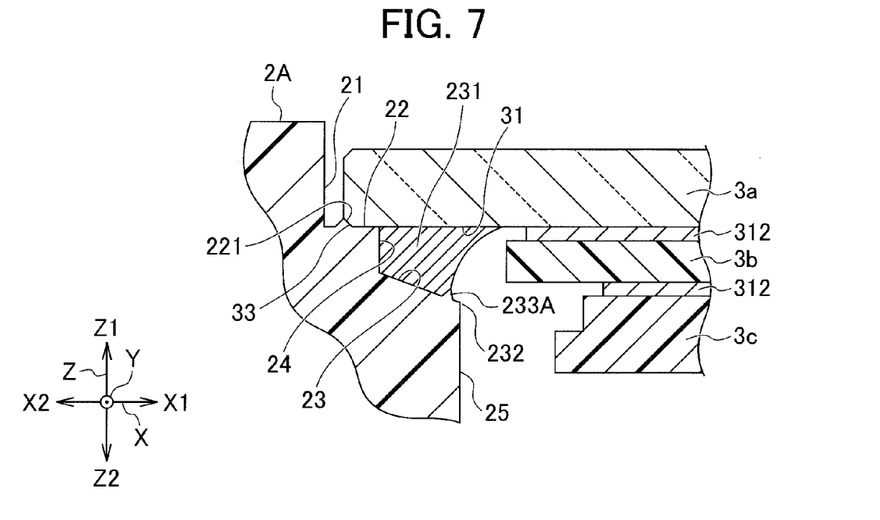
FIG. 7 is an enlarged cross-sectional view showing a portion where a cover glass 3a is bonded to a first body 2A, in a second embodiment.

As shown in FIG. 7, a second convex portion 233A is provided to the portable terminal device of the second embodiment, which is a point of difference from the portable terminal device 1 of the first embodiment. Other features are identical to the features of the portable terminal device 1 of the first embodiment. FIG. 7 is an enlarged cross-sectional view showing a portion where a cover glass 3a is bonded to a first body 2A, in the second embodiment.

More specifically, as shown in FIG. 7, the second convex portion 233A is provided on a second face 23 and in the vicinity of an edge 232. The second convex portion 233A protrudes from the second face 23 by about 0.1 mm in the third plus direction (Z1-direction), which is a direction transverse to a direction away from an adhesive 231. The second convex portion 233A extends so as to make a circuit of the first body 2A, along the vicinity of a pair of long sides 201 and 202 of the substantially rectangular first body 2A, and along the vicinity of a pair of short sides 203 and 204. A direction, in which the second convex portion 233A extends, is not parallel with the direction away from the adhesive 231, but is the second direction (Y-direction), which is a direction transverse to the direction away from the adhesive 231.

Since the second convex portion 233A is provided, the adhesive 231, which has spread out on the second face 23, can be suppressed from spreading out farther in a direction toward an inner face 25 beyond the second convex portion 233A.

Third Embodiment

Next, a third embodiment of the present invention is described. Note that an overall configuration of a portable terminal device 1B of the third embodiment is the same as the overall configuration of the portable terminal device 1 of the first embodiment; and therefore, points of difference are mainly described herein. In the third embodiment, the same reference numerals are assigned to the same constituent elements as in the first embodiment, and descriptions thereof are omitted as appropriate (some illustrations, reference numerals and descriptions thereof are omitted together). Members, which are characteristic of the third embodiment, are described by adding "B" to the reference numerals (except for the second body 2B).

Figure 8:
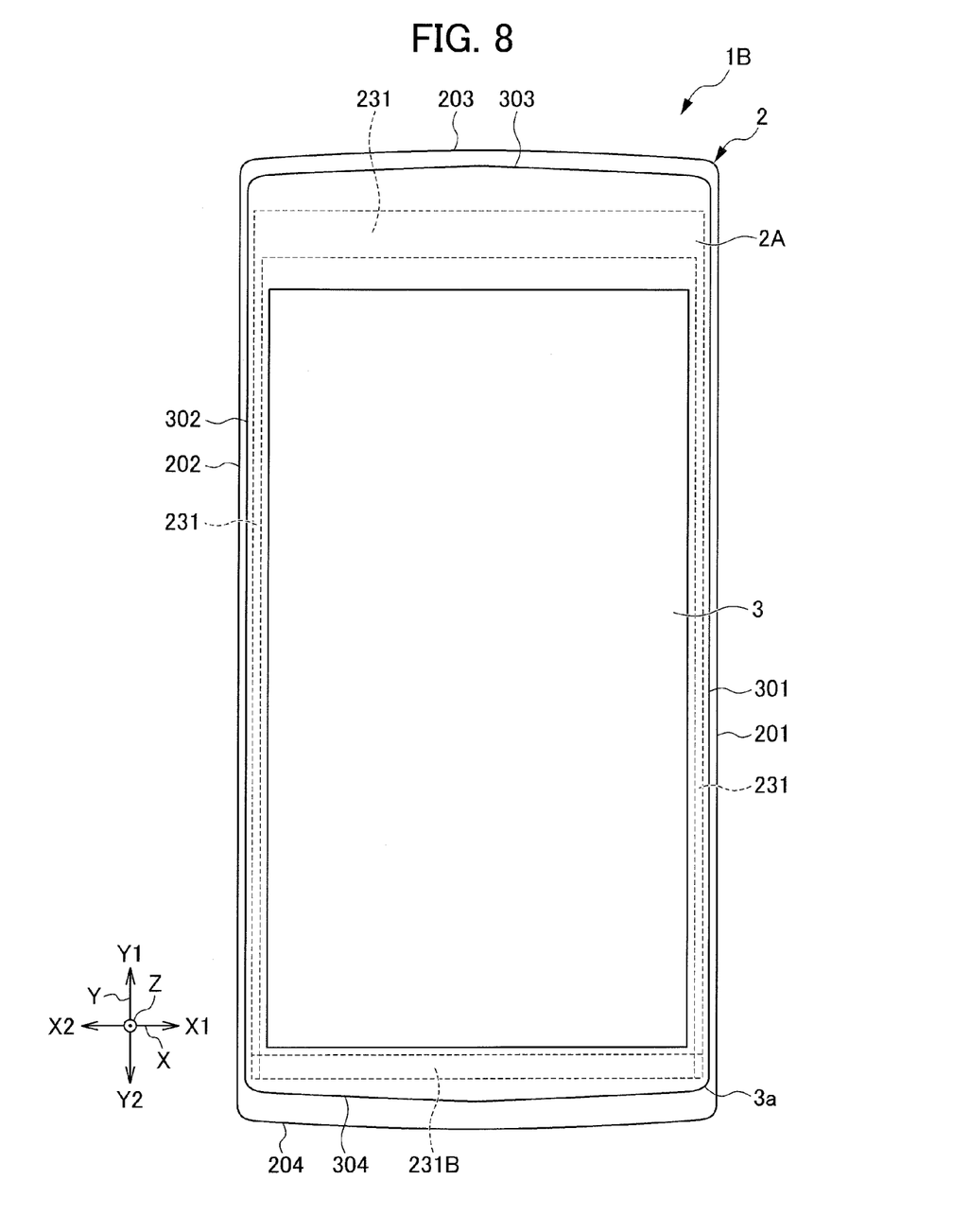
FIG. 8 is a front view showing an external appearance of a portable terminal device 1 in a third embodiment.

As shown in FIG. 8, a double-sided adhesive tape 231B is used in a part of the portable terminal device 1B of the third embodiment, which is a point of difference from the portable terminal device 1 of the first embodiment. Other features are identical to the features of the portable terminal device 1 of the first embodiment. FIG. 8 is a front view showing an external appearance of the portable terminal device 1 in the third embodiment.

As shown in FIG. 8, an adhesive 231 is provided in a substantial U-shape in a periphery of a first body 2A, along the vicinity of a pair of long sides 201 and 202 of the substantially rectangular first body 2A, and along the vicinity of a short side 203. Therefore, a cover glass 3a is bonded to the first body 2A, along a portion in the vicinity of a pair of long sides 301 and 302 of the cover glass 3a, and along a portion in the vicinity of a single short side 303. The double-sided adhesive tape 231B is provided along the vicinity of another short side 204 of the substantially rectangular first body 2A. Therefore, the cover glass 3a is joined to the first body 2A, along a portion in the vicinity of another short side 304 of the cover glass 3a.

That is, the adhesive 231 and the double-sided adhesive tape 231B are provided so as to make a circuit of the first body 2A, along the vicinity of the pair of long sides 201 and 202 of the substantially rectangular first body 2A, and along the vicinity of the pair of short sides 203 and 204.

In this manner, the double-sided adhesive tape 231B is provided along the vicinity of another short side 204 of the substantially rectangular first body 2A. Therefore, if by any chance failure occurs in the portable terminal device 1B, for the purpose of analyzing the failure, the touch screen display 3 can be easily removed from the portion where the cover glass 3a is joined to the first body 2A by way of the double-sided adhesive tape 231B in this manner.

The present invention is not limited to the first to third embodiments described above, and can be modified as appropriate, as described below.

For example, the stepped portion 20 has the lateral face 21, the first face 22, the second face 23, the third face 24, and the inner face 25; however, the present invention is not limited to this configuration. The stepped portion 20 may have at least the first face 22 and the second face 23. The configuration of the first face and the second face is not limited to the configuration of the present embodiments. For example, the second face 23 may not be subjected to surface-roughening treatment. The angle, at which the second face 23 intersects with the first face 22, is 5 to 30 degrees inclusive, and is more preferably 10 to 20 degrees inclusive; however, the present invention is not limited to such ranges of angles.

One or both of the first convex portion 221 and the second convex portion 233A may not be provided. The chamfer 33 of the cover glass 3a as the member-to-be-fixed may not be provided. In the third direction (Z-direction), a separation distance from the facing face 31 to the edge 232 is longer than a separation distance from the facing face 31 to the edge 32; however, the present invention is not limited to this configuration.

The first and second embodiments have been described for a case, in which the portable electronic device according to the present invention is applied to the portable terminal device. Without limitation thereto, the portable electronic device according to the present invention can be applied to a portable electronic device including a microphone in general, such as a tablet terminal device, a PDA (Personal Digital Assistant), and a portable navigation device.

EXPLANATION OF REFERENCE NUMERALS 1, 1B portable terminal device
2A first body (body)
3a cover glass (member-to-be-fixed)
3b touch screen (second member-to-be-fixed)
22 first face
23 second face
24 third face
31 facing face
32, 232 end
33 chamfer
221 first convex portion
231 adhesive
233A second convex portion
311 non-facing portion

The invention claimed is:

1. A portable electronic device, comprising:
a body comprising a peripheral portion; and
a member comprising a member face that faces the body, wherein the member face comprises a peripheral portion that is fixed to the peripheral portion of the body by way of an adhesive;
wherein the peripheral portion of the body comprises
a first face, on which the peripheral portion of the member face is mounted, wherein the first face is substantially parallel to the member face and
a second face at a greater distance from the peripheral portion of the member face than the first face, wherein the second face is inclined with respect to the first face such that the second face is not parallel with the member face, and
wherein the adhesive is interposed between the member face and the second face.

2. The portable electronic device according to claim 1, wherein the peripheral portion of the body further comprises a third face between the first face and the second face, wherein the third face extends from the first face in a direction away from the member.

3. The portable electronic device according to claim 2, wherein the second face comprises a roughened surface.

4. The portable electronic device according to claim 3, wherein the roughened surface of the second face is roughened by a laser, or by surface-roughening a part of a mold forming the body.

5. The portable electronic device according to claim 1 or 2, wherein an edge of the member face comprises a chamfer, and wherein the first face comprises a first convex portion arranged at a position corresponding to the chamfer.

6. The portable electronic device according to claim 5, wherein the first convex portion extends around the peripheral portion of the body.

7. The portable electronic device according to claim 5, wherein the chamfer is provided along an entire peripheral portion of the member.

8. The portable electronic device according to claim 1, wherein the second face comprises a second convex portion extending in a direction toward the member face.

9. The portable electronic device according to claim 8, wherein the second convex portion is provided at an end portion of the second face, and wherein the end portion is located in an opposite direction with respect to the first face.

10. The portable electronic device according to claim 1, wherein the second face is inclined with respect to the first face at an angle of 5 to 30 degrees inclusive.

11. The portable electronic device according to claim 1,
wherein the member face comprises a non-facing portion, which does not face the first face and the second face;
wherein a second member is fixed to the non-facing portion; and
wherein an edge of the second face, which is farthest from the member face, is at a greater separation distance from the member face than an edge of the second member, which is farthest from the member face.

12. The portable electronic device according to claim 11, wherein the member comprises a glass cover, and wherein the second member comprises a touch screen.

13. The portable electronic device according to claim 1,
wherein the body is substantially rectangular;
wherein the member is substantially rectangular and smaller than the body;
wherein a pair of short sides of the member is arranged adjacently to a pair of short sides of the body, respectively;
wherein a pair of long sides of the member is arranged adjacently to a pair of long sides of the body, respectively;
wherein the member is fixed to the body, along a portion in a vicinity of the pair of long sides of the member and along a portion in a vicinity of one of the short sides of the member, by the adhesive; and
wherein the member is fixed to the body, along the other of the short sides of the member, by double-sided adhesive tape.

14. The portable electronic device according to claim 1, wherein the member further comprises a non-facing portion which faces neither the first face nor the second face, and wherein the non-facing portion is located more central than the member face.

15. The portable electronic device according to claim 1, wherein the adhesive is flattened out on the member face, such that the adhesive spreads beyond a width of the second face.

16. The portable electronic device according to claim 1, wherein the peripheral portion of the body comprises a stepped portion which is provided with the first face and the second face.

* * * * *